May 21, 1968

S. C. WARRICK, JR 3,384,738

SIGNAL-RESOLVING APPARATUS

Filed Sept. 26, 1963

INVENTOR.
STUART C. WARRICK
BY Roy M Pitts
ATTORNEY

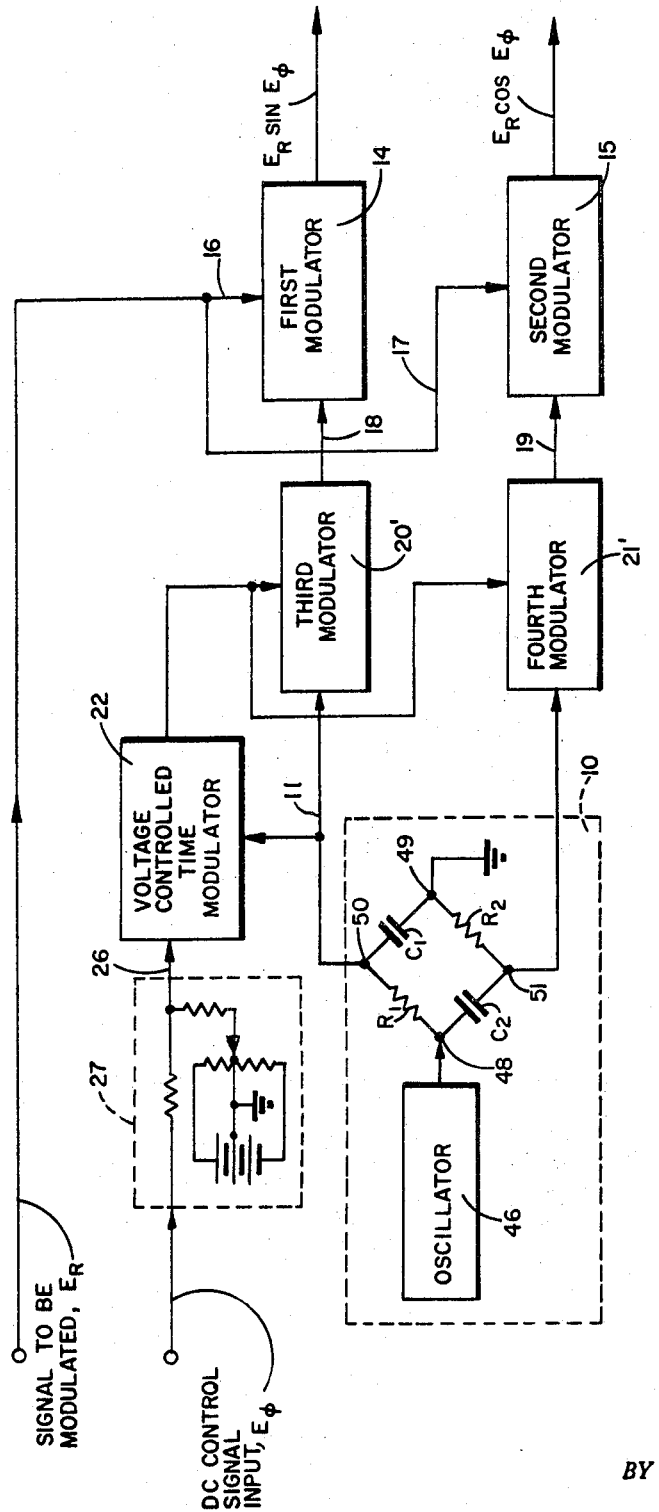

United States Patent Office 3,384,738
Patented May 21, 1968

3,384,738
SIGNAL-RESOLVING APPARATUS
Stuart C. Warrick, Jr., La Sierra, Calif., assignor to North American Rockwell Corporation, a corporation of Delaware
Filed Sept. 26, 1963, Ser. No. 311,817
7 Claims. (Cl. 235—189)

ABSTRACT OF THE DISCLOSURE

An electronic signal resolver generating analog signals indicative of the mutually orthogonal components of a resolved vector quantity. A high frequency sinusoidal signal source provides two outputs in mutually time-phase quadrature relationship to respective ones of two sample-and-hold devices. Voltage controlled time modulating means responsive to one of the high frequency source outputs and having a control input responsive to a signal analog of a resolving angle, provides a sampling control input to the sample-and-hold devices which, in turn, provide respective modulating inputs to respective ones of two amplitude modulators, commonly responsive to the signal-to-be-resolved.

Background of the invention

The subject invention relates to means for generating signals indicative of the mutually orthogonal components of a resolved vector quantity, and more particularly to electronic signal resolving means exclusive of electromechanical resolvers.

In the data processing of electrical signals, it is frequently required to resolve an electrical signal (representing a scalar analog quantity) into two signals representing mutually orthogonal components of a resolved vector quantity. Such resolution may be desired, for example, in further processing of a preselected one of the component signals of the resolved signal.

In the prior art, such signal resolution has been accomplished by electro-mechanical devices such as synchros and resolvers. In such electro-mechanical devices, the scalar analog voltage of a sensed parameter is fed to the excitation terminals of the device to establish either an electro-magnetic field about a transformer winding, or else to establish an IR drop across the resistive element of a potentiometer. An angular motion or mechanical rotation of one element relative to another (say a secondary transformer coil relative to the primary winding or a sine-cosine potentiometer wiper contact position relative to a reference contact position on the potentiometer resistive element) produces a change in the output level of the resolver, which change corresponds to the sine or cosine of the angular motion (or angular displacement).

In the use of a potentiometer as a resolver, it is required that a non-linear mandrel be employed in manufacture of the potentiometer, the non-linearity being shaped or adapted to provide the desired sinusoidal function. Such devices are costly and of a limited accuracy.

Such devices rely upon a mechanical rotation or angular displacement input corresponding to the angle of interest. Hence, where electrical signals representing an angle of interest (generally, linearly representing the angle) are provided (instead of a mechanical rotational signal being provided, representing the angle), then complex rotational position servos are required, in order to convert the form (electrical signal) of the angular information to a form more generally usable by such electro-mechanical resolvers. Also, in the use of the prior art electromechanical resolver devices, careful adjustment and maintenance are required in order to assure the alignment of the electrical signal null positions of the servo with the corresponding mechanical zero or reference positions. Further, the dynamic speeds of response of such positional servos are limited, as to affect the accuracy of the results in response to rapidly changing electrical analogs of angles in combination with rapidly changing signals-to-be-resolved. Moreover, such electromechanical elements do not lend themselves to the degree of microminiaturization obtainable with completely electronic circuit devices.

Such prior art mechanical resolvers are more fully discussed in further detail, for example, at pages 330–337 of "Electronic Analog Computers" (second edition) by Korn and Korn, published by McGraw-Hill (1956).

Accordingly, it is an object of the subject invention to provide wholly electronic means for resolving an electrical signal into a sine or cosine function (or both).

In a preferred embodiment of the subject invention there is provided high frequency means for having a first and second output for generating respective first and second periodic electrical signals of like frequency and in mutual time-phase quadrature relation. There is also provided signalling means responsive to the first output of the high frequency means for providing a periodic sampling signal. There is further provided a first and second amplitude modulator having commonly connected first inputs adapted to be connected to a source of a signal to be amplitude modulated, a second input of respective ones of the modulators being responsively connected to the first and second outputs of the high frequency means by first and second sample-and-hold means interposed in circuit between the high frequency means and the first and second modulators respectively. Voltage-controlled time modulator commonly connects a sampling control input of each of the sampling means to the signalling means, a control input of the time modulator means being adapted to be connected to a source of a delay control voltage.

In normal operation of the above described arrangement, a control voltage is applied to the control input of the voltage controlled time modulator, causing the synchronous sampling signal (applied to the control input of the sample-and-hold means) to be correspondingly delayed. Such delayed sampling signal causes the sample-and-hold means to sample correspondingly delayed portions of the waveforms from the associated output of the high frequency means. Hence, the amplitude of the synchronously sampled first output of the high frequency means is a sine function of the delay control voltage and the sampled second output is a cosine function of such control voltage.

In other words, the input to each of the amplitude modulators from the associated one of the sample-and-hold means will be indicative of the sine and cosine respectively of the control signal applied to the voltage-controlled time modulator means. Therefore, the output of the amplitude modulators will be indicative of the product of the amplitude of the scalar signal-to-be-resolved and the sine and cosine, respectively, of the control signal. Further, the speed of response of the device will not be limited by mechanical inertia and mechanical damping effects. Moreover, the device will not require alignment of electrical and mechanical nulls.

Accordingly, it is an object of the invention to provide improved means for resolving a first electrical signal as a function of the sine and cosine of a second electrical signal.

It is another object of the subject invention to provide electronic signal resolving means having improved dynamic speeds of response.

It is a further object of the invention to provide electronic signal resolving means suitably adapted to microminiaturization circuit techniques of manufacture.

It is yet a further object of the subject patent to provide signal resolving means requiring no alignment of electrical nulls and mechanical spatial references.

These and further objects will become apparent from the following description, taken in conjunction with the following drawings in which:

FIG. 4 is an alternate embodiment of the invention.

Figure 1:
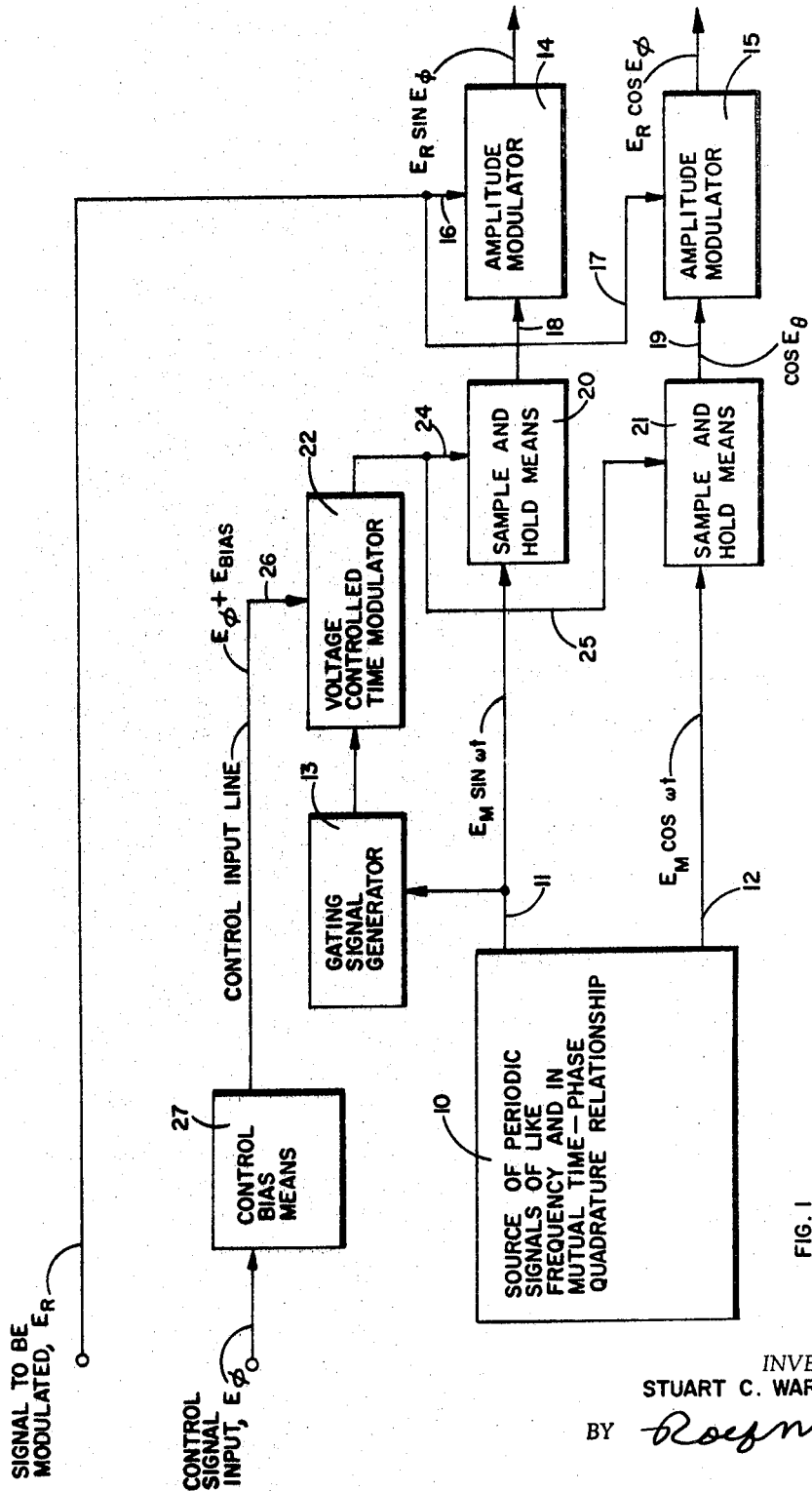
FIG. 1 is a block diagram of a device illustrating the concept of the invention.

Referring to FIG. 1 there is illustrated a block diagram of the concept of the invention. There is provided electronic means for multiplying a scalar analog voltage by the sine and cosine respectively of a second analog voltage, comprising high frequency means 10 having a first and second sinusoidal output 11 and 12 for providing respective first and second periodic signals of like frequency and in mutual time-phase quadrature relation. The construction and arrangement of high frequency means 10 is described more fully hereinafter and is therefore shown only in block form in FIG. 1 for convenience in exposition.

There is also provided signalling means 13 responsive to first output 11 (of high frequency means 10) for providing a periodic trigger or sample-gating signal. Signalling means 13 may be comprised of a Schmidt trigger and associated pulse shaping networks; or other means well known in the art for providing a trigger signal each cycle of, or synchronous with, the first output of generator 10.

There is further provided first and second amplitude modulators 14 and 15, each having a commonly connected first input 16 and 17, adapted to be connected to a source (not shown) of a signal to be modulated. A second input 18 and 19 of respective ones of modulators 14 and 15 is respectively connected to the first and second output 11 and 12, respectively, of high-frequency means 10. The construction and arrangement of means for modulating one signal by the amplitude of another signal is well-known in the art, for which reason elements 14 and 15 are shown in block form only.

A first and second signal sampling and hold means 20 and 21 are interposed in circuit between high frequency means 10 and first and second modulators 14 and 15, respectively. Elements 14 and 15 are similarly constructed and arranged, and may be comprised, for example, of a signal gate having a low-pass filter on the output thereof. Voltage-controlled time modulator 22 commonly connects a respective sampling control input 24 and 25 of each of sample-and-hold means 20 and 21 to trigger signalling means 13, a control input 26 of phase-shift means 22 being adapted to be connected to a source (not shown) of a control voltage, $E_\phi$. One exemplary embodiment of voltage-controlled time modulator 22 is shown in FIG. 2.

Figure 2:
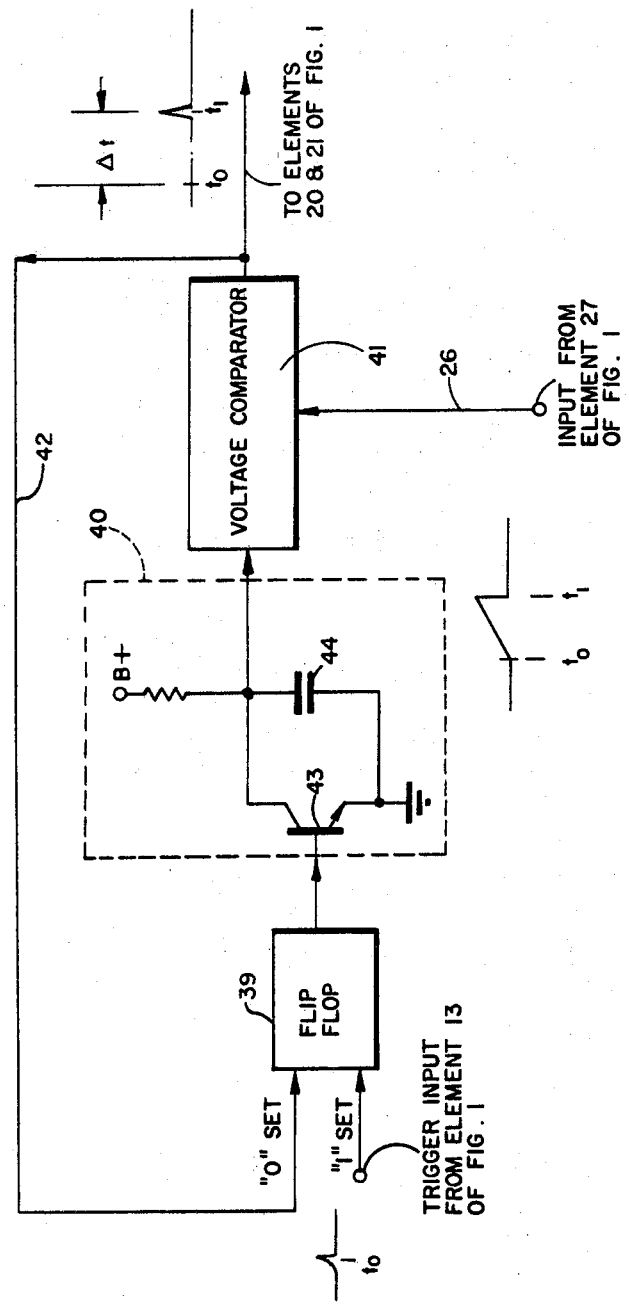
FIG. 2 is a schematic diagram of the voltage-sensitive signal delay means of FIG. 1.

Referring to FIG. 2, there is illustrated a schematic diagram of an exemplary embodiment of the time modulator 22 of FIG. 1. There is provided a flip-flop 39, an R-C sweep generator 40, and comparator 41. The construction and arrangement of an exemplary circuit for comparator 41 is shown in FIG. 6.27a on page 298 of "Electronic Analog Computers" (second edition) by Korn and Korn, published by McGraw-Hill (1956). Accordingly, element 41 is shown in block form only. The output of comparator 41 is applied on line 42 as a reset signal to a reset input of flip-flop 39 for providing a first state thereof. The output of flip-flop 39 indicative of such first state, and corresponding to a switching signal, is fed to the base of switching transistor 43 of the R-C sweep generator 40. Such first state signal thus causes switching transistor 43 to conduct, thereby shorting the capacitor 44 of R-C sweep generator 40.

The trigger signal from pulse generator 13 (in FIG. 1) is applied to a second input of flip-flop 39 for providing a second state thereof, corresponding to the removal of the shorting signal from the base of transistor 43. Upon the removal of the shorting signal, R-C sweep generator 40 then commences to generate an output response which increases with the time interval elapsing subsequent to the removal of the shorting signal, as is well-understood in the art.

Such response or sawtooth signal from generator 40 is fed as a first input to comparator 41, and compared with the control signal from line 26 (of FIG. 1). When the output of generator 40 exceeds the magnitude of the D-C control signal from line 26, then an output is provided from comparator 41, as is well understood in the art. Such output from comparator 41 resets flip-flop 39 to the first state, thereby causing transistor 43 to again short-circuit R-C generator 40, whereupon the output of comparator 41 subsides.

The resulting intervening output from comparator 41 constitutes a signal of short duration, corresponding to the pulsed output of trigger generator 13 (of FIG. 1), and delayed in time relative thereto by an amount $\Delta t$ corresponding to the magnitude of the control signal on line 26 (of FIG. 1).

Interposed at the control input 26 of signal delay means 22 (in FIG. 1) is adjustable control bias means 27 for biasing the control input of phase-shifter 22. In this way, the magnitude of the output of modulator 14 can be adjusted to a minimum in the absence of a control voltage (e.g., $E_\phi=0$), for reasons which will become more apparent hereinafter.

Figure 3:
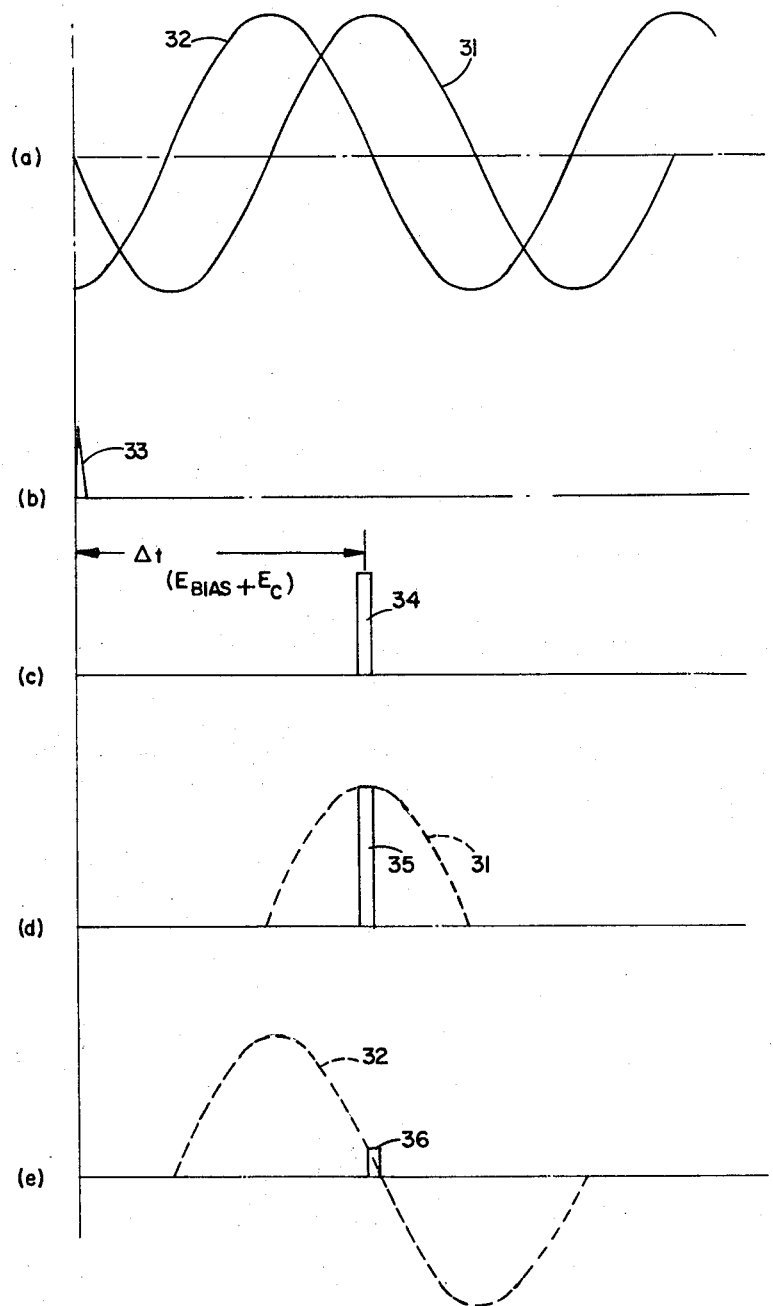
FIG. 3 is a family of time histories illustrating the operation of the device of FIG. 1.

The normal operation of the device of FIG. 1 can be better understood by reference to the component responses shown in FIG. 3.

Referring to FIG. 3, there is illustrated a family of time histories of the responses of several elements of the device of FIG. 1. Curves 31 and 32 represent the first and second sinusoidal outputs, respectively of high-frequency means 10 (e.g., the respective inputs of sample-and-hold means 20 and 21), and illustrate the time-quadrature relationship between them. Curve 33 represents the trigger signal generated by trigger signal means 13. Curve 34 represents the time-delay or phase-shift of the trigger signal through time modulator 22 in response to the combination of an applied control signal ($E_\phi$) and a bias signal ($E_{bias}$) supplied by element 27 (in FIG. 1).

Curves 35 and 36 represent the respective sampled inputs to elements 20 and 21, illustrating the respective sinusoidal and cosine relationship thereof to the combined control signal input ($E_\phi + E_{bias}$) applied to time modulator 22. In other words, a component of the control voltage applied to phase-shifter 22 corresponds to that component ($\Delta t_1$) of the delay time $\Delta t$, indicative of the time interval between the crossover or null of curve 31 and the sampling thereof (curve 35). The amplitude of curve 35 is seen to be a sinusoidal function of $\Delta t_1$ (and of that component of ($E_\phi + E_{bias}$) corresponding to $\Delta t_1$). The system is adjusted in the absence of a control signal input ($E_\phi=0$), by adjusting the bias ($E_{bias}$) of element 27 (in FIG. 1) until the delayed sampling pulse 34 occurs at the crossover or null of curve 31 (e.g., the sampled portion 35 of curve 31 is zero). Such condition is indicated when the output of first modulator 14 is a minimum (corresponding to sin $0°=0$), and the associated output of modulator 15 is a maximum (corresponding to cos $0°=1.0$). Hence, any additional input to voltage controlled time modulator 22, as provided by a control voltage source, will cause the sampling signal 34 to be delayed by an incremental amount indicative of such control voltage, and will produce corresponding outputs at modulators 14 and 15 indicative of the sine and cosine function respectively of such control voltage.

Accordingly, the device of FIG. 1 provides all-electronic means, exclusive of rotary electromechanical means, for resolving an electrical-scalar signal as respective sine and cosine functions of a second electrical analog signal.

Although the device of FIG. 1 has been described in terms of sampled signal means by employing variably-delayed periodic sampling or trigger signals, the concept of the invention is not so limited. For example, the interposed trigger signal generator 13 of FIG. 1 could be omitted; and low-frequency, or low-pass, amplitude modulators substituted for gated means 20 and 21, as shown in FIG. 4.

Also shown in FIG. 4 is exemplary means 10 for obtaining two periodic signals of like frequency and between which a mutual time-phase quadrature relation exists. There is provided a source 46 of a high frequency sinusoidal signal, such as a heavily-filtered crystal-oscillator or the like. Connected to the output of oscillator 46 is a four-terminal phase shift bridge 47 comprising two R-C networks in parallel circuit across input terminals 48 and a common ground terminal 49. A first and second output terminals 50 and 51 of bridge 47 provides respective first and second output signals of like frequency (e.g., the oscillator frequency).

A first resistor of resistance $R_1$ interconnects terminals 48 and 50; a second resistor of resistance $R_2$ interconnects terminals 49 and 51; a first capacitor of capacitance $C_1$ interconnects terminals 49 and 50, and a second capacitor of capacitance $C_2$ interconnects terminals 48 and 51.

The series connected resistor and capacitor of each of the parallel R-C networks are preferably of like impedance at the oscillator frequency (e.g., $$R_1 = R_2 = \frac{1}{2\pi f C_1} = \frac{1}{2\pi f C_2}$$

Further, ratio of the first output ($e_1$) at terminal 50 to the input ($e_0$) at terminal 48 may be expressed as the ratio of the output impedance of $C_1$ to the series impedance of $R_1$ and $C_1$ as follows:

$$\frac{e_1}{e_0} = \frac{\frac{1}{j\omega C_1}}{R_1 + \frac{1}{j\omega C_1}} = \frac{1}{j\omega R_1 C_1 + 1} \quad (1)$$

where $\omega$=the frequency in radians per second of the outputs of oscillator 46. The ratio of the second output ($e_2$) at terminal 51 may be similarly expressed:

$$\frac{e_2}{e_0} = \frac{R_2}{R_2 + \frac{1}{j\omega C_2}} = \frac{j\omega R_2 C_2}{j\omega R_2 C_2 + 1} \quad (2)$$

That $e_1$ and $e_2$ are maintained in a mutual time phase quadrature-relation may be seen from a comparison of Equations 1 and 2:

$$\frac{e_2}{e_1} = \frac{j\omega R_2 C_2}{j\omega R_2 C_2 + 1} \times \frac{j\omega R_1 C_1 + 1}{1} \quad (3)$$

Now, where ($R_1 = R_2$) and ($C_1 = C_2$), then $$\frac{e_2}{e_1} = j\omega R_2 C_2 \quad (4)$$

which indicates the time phase quadrature relation between $e_2$ and $e_1$. However, it is preferred that the two signals be of like amplitude. Accordingly, for the fixed frequency ($\omega$) of oscillator 46, the ratio of $e_2$ to $e_1$ is preferably unity. In other words, $$\omega R_2 C_2 = 1 \quad (5)$$

or:

$$R_2 = \frac{1}{\omega C_2} = R_1 = \frac{1}{\omega C_1} \quad (6)$$

It is clear that the output of an amplitude modulator in response to two inputs is indicative of the product thereof. Accordingly, the effect of the periodic input to modulator 20' from output 11 (of element 10), and the delayed periodic input from a phase shifter employed as the time modulator 22 may be written as follows:

$$E_m \sin \omega t E_m \sin (\omega t + \phi) = E_m^2 \sin 2\omega t + E_m^2 \sin \phi \quad (7)$$

The output from modulator 21' may be similarly written as:

$$E_m \cos \omega t E_m \sin (\omega t + \phi) = E_m^2 \cos 2\omega t + E_m^2 \sin \phi \quad (8)$$

Where the rate at which the delay ($\phi$) is changing is small relative to the periodic high frequency component ($\sin 2\omega t$), then such periodic component may be easily attenuated by a low-pass (R-C) filter at the output of each of modulators 20' and 21'. Then, the output of such modulators would be essentially indicative of only that component of the right hand member of Equations 1 and 2, respectively, which is the sinusoidal function of the delay ($\phi$) and hence, of the delay-producing incremental voltage ($E_\delta$). For example, the low pass output of modulator 20' would be indicative of $\sin \phi$ and, the corresponding low pass output of modulator 21' would be indicative of $\cos \phi$.

Hence, it is to be appreciated that the concept of the invention provides electronic means exclusive of electromechanical resolvers for generating two scalar signals indicative of the mutually orthogonal components of a first signal resolved as a function of a second signal.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In combination, means for generating a signal representing at least one of the sine and cosine functions of a selected angle from an electrical signal representing such angle, comprising means for generating a fixed amplitude sinusoidal waveform, means for generating a signal of variable time delay in response to an input signal, sample-and-hold means responsive to said sinusoidal signal and said delayed signal to provide an output signal representing a sinusoidal function of said input signal, and amplitude modulating means responsive to said output signal for modulating a signal to be resolved.

2. Electronic means for resolving a signal into mutually orthogonal components indicative of a selected resolving angle, comprising the combination:

A first source of a high-frequency periodic modulating signal;

Passive phase-shift means responsive to said first source for providing a first output and second output in mutual time-phase quadrature relation;

Voltage-controlled time modulator means having a first input operatively connected to said first output of said passive phase shift means, and further having a control input adapted to be connected to a source of an analog voltage of an angle;

First and second data sampling means commonly connected to said voltage-controlled time modulator means, a second input of a respective one of said first and second sampling means being connected to said first output and second output respectively of said passive phase shift means;

First and second amplitude modulating means, a first input of each of said amplitude modulating means being commonly connected, and adapted for connection to a source of a signal to be resolved, a second input of each of the first and second amplitude modulating means being connected to the respective outputs of said first and second sampling means.

3. The device of claim 2 in which there is further provided signal bias means for biasing the input of said voltage-controlled time modulator means, whereby in the absence of an analog voltage source, the respective outputs of said first and second amplitude modulators is a minimum and maximum, respectively.

4. The device of claim 2 in which there is further provided summing means interposed at the control input of said voltage-controlled time modulator means and a source of an adjustable bias voltage operatively connected to said summing means for biasing said control input.

5. The device of claim 2 in which said time modulator means is compised of a flip-flop having an input responsive to a shaped output of said first source; an R-C sweep generator in driven relationship to said flip-flop, and a comparator connected to compare the output of said sweep generator with said analog voltage, said output of said comparator being coupled to reset said flip-flop and to provide a delayed pulse input to said sampling means.

6. The combination comprising:
High frequency means having a first and second output for providing respective first and second periodic signals of like frequency and in mutual time-phase quadrature relation;
Signalling means responsive to said first output of said high frequency means for providing a periodic gating signal;
First and second amplitude modulators each having a commonly connected first input adapted to be connected to a source of a signal to be modulated, a second input of respective ones of said amplitude modulators being responsively connected to said first and second outputs respectively of high frequency means;
First and second sample-and-hold means interposed in circuit between said high-frequency means and said first and second amplitude modulators respectively;
Voltage-controlled time modulator means commonly connecting a gating control input of each said sample-and-hold means to said signalling means, a control input of said time modulator means being adapted to be connected to a source of a control voltage.

7. The device of claim 6 in which there is further provided signal bias means for biasing the input of said time modulator means whereby, in the absence of a source of a control voltage, the respective outputs of said first and second amplitude modulators is a minimum and maximum, respectively.

References Cited

UNITED STATES PATENTS

| | | | |
|---|---|---|---|
| 2,997,601 | 8/1961 | Taylor et al. | 328—55 |
| 2,926,852 | 3/1960 | Bennett | 235—189 |
| 3,068,467 | 12/1962 | Grimaila | 235—189 |
| 3,187,169 | 6/1965 | Trammell et al. | 235—189 |

MALCOLM A. MORRISON, *Primary Examiner.*

K. W. DOBYNS, *Assistant Examiner.*